(12) United States Patent
Mathai (10) Patent No.: US 11,715,992 B2
(45) Date of Patent: Aug. 1, 2023

(54) AIR OUTLET SOUND ABSORBER FOR A ROTATING ELECTRICAL MACHINE

(71) Applicant: BRUSH ELECTRICAL MACHINES LIMITED, Birmingham (GB)

(72) Inventor: Dennis Mathai, Loughborough (GB)

(73) Assignee: Brush Electrical Machines Limited, Birmingham (GB)

( * ) Notice: Subject to any disclaimer, the term of this patent is extended or adjusted under 35 U.S.C. 154(b) by 457 days.

(21) Appl. No.: 16/761,036

(22) PCT Filed: Nov. 1, 2018

(86) PCT No.: PCT/GB2018/053166
§ 371 (c)(1),
(2) Date: May 1, 2020

(87) PCT Pub. No.: WO2019/086879
PCT Pub. Date: May 9, 2019

(65) Prior Publication Data
US 2021/0180487 A1 Jun. 17, 2021

(30) Foreign Application Priority Data
Nov. 2, 2017 (GB) ..................... 1718127

(51) Int. Cl.
*H02K 5/24* (2006.01)
*G10K 11/162* (2006.01)
*G10K 11/172* (2006.01)

(52) U.S. Cl.
CPC ............ *H02K 5/24* (2013.01); *G10K 11/162* (2013.01); *G10K 11/172* (2013.01)

(58) Field of Classification Search
CPC .......... F24F 2013/242; F24F 2013/245; G10K 11/162; G10K 11/172; H02K 5/24
(Continued)

(56) References Cited

U.S. PATENT DOCUMENTS 2,989,136 A * 6/1961 Wohlberg ............ G10K 11/172
52/794.1
4,150,313 A 4/1979 Panza
(Continued)

FOREIGN PATENT DOCUMENTS

CN 201266868 7/2009
CN 106715849 A 5/2017
(Continued)

OTHER PUBLICATIONS

International Search Report and Written Opinion, PCT/GB2018/053166, Brush Electrical Machines Limited (dated Jan. 25, 2019).
(Continued)

*Primary Examiner* — Jeremy A Luks
(74) *Attorney, Agent, or Firm* — Foley & Lardner LLP (57) ABSTRACT

A rotating electrical machine such as a generator has a rotor disposed within a rotor housing and an air flow path passing from the rotor housing to and through a silencer to an exhaust. The silencer comprises at least one air flow path disposed adjacent at least one sound absorbing column, the column comprising a first portion having a first sound absorbing material therein and a second portion having a microperforated panel (MPP) and a resonator cavity. The second portion comprises a reactive sound absorbing unit which can be specifically tuned to suppress aero-acoustic noise generated by ventilation slots in the rotor, typically peaks at 100 Hz or 120 Hz.

20 Claims, 9 Drawing Sheets

(58) Field of Classification Search
USPC .................................................. 181/224, 225
See application file for complete search history.

(56) References Cited

U.S. PATENT DOCUMENTS

| | | | | |
|---|---|---|---|---|
| 4,266,602 | A * | 5/1981 | White | H01F 27/085 |
| | | | | 165/DIG. 313 |
| 4,330,047 | A * | 5/1982 | Ruspa | F24F 13/24 |
| | | | | 454/906 |
| 5,124,600 | A | 6/1992 | Hedeen | |
| 5,268,541 | A * | 12/1993 | Pettersson | F24F 13/24 |
| | | | | 181/243 |
| 5,332,872 | A * | 7/1994 | Ewanek | F04D 29/663 |
| | | | | 181/258 |
| 5,453,647 | A | 9/1995 | Hedeen | |
| 5,473,124 | A * | 12/1995 | Yazici | F24F 13/24 |
| | | | | 454/906 |
| 5,728,979 | A * | 3/1998 | Yazici | F24F 7/08 |
| | | | | 181/224 |
| 5,869,792 | A * | 2/1999 | Allen | F02M 35/1216 |
| | | | | 181/224 |
| 6,342,005 | B1 * | 1/2002 | Daniels | F24F 13/24 |
| | | | | 454/906 |
| 6,402,612 | B2 * | 6/2002 | Akhtar | F24F 7/007 |
| | | | | 454/906 |
| 6,537,490 | B2 * | 3/2003 | Han | F04D 29/664 |
| | | | | 181/224 |
| 6,799,657 | B2 * | 10/2004 | Daniels | F04B 39/0061 |
| | | | | 181/252 |
| 7,942,234 | B2 * | 5/2011 | Utsunomiya | G03B 21/16 |
| | | | | 381/71.5 |
| 8,240,429 | B1 * | 8/2012 | Singhal | H02K 5/24 |
| | | | | 181/212 |
| 10,119,469 | B2 * | 11/2018 | Ponyavin | G10K 11/161 |
| 2003/0192737 | A1 | 10/2003 | Han et al. | |
| 2009/0277714 | A1 * | 11/2009 | Putnam | F02K 1/827 |
| | | | | 181/213 |
| 2016/0258357 | A1 * | 9/2016 | Zhang | F02C 7/045 |
| 2017/0219153 | A1 * | 8/2017 | Hill | F16L 55/0331 |
| 2018/0238583 | A1 * | 8/2018 | Jeong | F24F 13/0263 |

FOREIGN PATENT DOCUMENTS

| | | |
|---|---|---|
| EP | 1 895 362 | 3/2008 |
| JP | S57-003363 U | 1/1982 |
| JP | 62-217833 A | 9/1987 |
| JP | S62-217833 | 9/1987 |
| JP | 02-102313 A | 4/1990 |
| JP | H02-102313 A | 4/1990 |
| JP | H07-091727 A | 4/1995 |
| JP | H791727 A | 4/1995 |
| JP | 2001-092468 A | 4/2001 |
| JP | 2001-222065 A | 8/2001 |
| JP | 2003-050586 | 2/2003 |
| JP | 2003-108148 | 4/2003 |
| KR | 100924958 B1 * | 11/2009 |
| KR | 101030440 B1 * | 4/2011 |
| RU | 2494266 C2 | 9/2013 |
| WO | WO-2016/040431 | 3/2016 |

OTHER PUBLICATIONS

Fuchs, H.V. 2013. Applied Acoustics: Concepts, Absorbers and Silencers for Acoustical Comfort and Noise Control. Springer, Chapter 6 and 9, pp. 63-65 and 105-111, 10 Pages.

Howard, C. Q., Cazzolato, B. S. 2015. Acoustic Analyses Using MATLAB and ANSYS. CRC Press. pp. 329-330, 2 Pages.

Hua, X., Herrin, D., Jackson, P.; Varying Backing Cavity Depths to Achieve Broadband Absorption using Micro-Perforated Panel. ResearchGate. Aug. 2013, 8 Pages.

Marze et al., Rigid-Frame Porous Material Acoustic Attenuation on Compressor Discharge. Purdue e-Pubs. Jun. 2012, 10 Pages.

UKIPO Search Report, App. No. 1718127.2, Brush Electrical Machines Limited (dated May 1, 2018).

Office Action issued in CN Application 201880075265.4 dated Feb. 16, 2022.

Office Action issued in India Application 202017020901 dated Nov. 15, 2021.

Office Action issued in UK Application 1718127.2 dated Feb. 28, 2022.

Office action issued in JP Application No. 2020-544169 dated Dec. 21, 2021.

* cited by examiner

FIG. 13

AIR OUTLET SOUND ABSORBER FOR A ROTATING ELECTRICAL MACHINE

CROSS-REFERENCE TO RELATED APPLICATIONS

This application is a National Stage Application of PCT/GB2018/053166, filed Nov. 1, 2018, which claims the benefit of and priority to Great Britain Patent Application No. 1718127.2, filed Nov. 2, 2017, the entire contents of which are incorporated herein by reference.

TECHNICAL FIELD

The present disclosure relates to sound absorbing structures used in air exhaust pathways for electrical generators, electric motors and other rotating electrical machines.

BACKGROUND

The control of noise emissions from large rotating electrical machines is often important in the design and implementation of such equipment. Along with well-known vibration-induced noise, there can be significant aerodynamic noise arising from air flows generated by the rapid rotation of components of the rotating electrical machine. The expression 'rotating electrical machine' is intended to encompass all electrical machines having a rotor component that is ventilated by air flows and/or which generates such airflows during rotation.

SUMMARY

The present invention is directed towards mitigating the effects of aerodynamic noise from such machines.

According to one aspect, the present invention provides a rotating electrical machine comprising:
 a rotor disposed within a rotor housing;
 an air flow path passing from the rotor housing to and through a silencer to an exhaust,
 the silencer comprising at least one air flow path disposed adjacent at least one sound absorbing column, the column comprising a first portion having a first sound absorbing material therein and a second portion having a microperforated panel (MPP) and a resonator cavity.

The silencer may comprise the at least one air flow path defined between two of the sound absorbing columns. The sound absorbing column may further include a third portion having sound absorbing material therein. The rotating electrical machine may have a second MPP in the resonator cavity. The resonator cavity may be divided into plural compartments transverse to the direction of the air flow path past the column. The resonator cavity may be divided into plural compartments having different depths. The second portion of the column may be tuned for a peak absorption between 80 and 180 Hz, or more particularly between 100 and 120 Hz. The second portion of the column may be tuned for a peak absorption between 60 and 300 Hz, or more particularly between 100 and 120 Hz. The second portion of the column may be tuned for a peak absorption at the electrical supply frequency of the rotor or harmonic thereof. The first sound absorbing material may be a porous absorber. The porous absorber may be foam or Rockwool. The first portion of the sound absorbing column may be between the rotor and the second portion of the sound absorbing column. The first portion of the sound absorbing column may lie between the rotor and the second portion of the sound absorbing column and the second portion may lie between the first portion and the third portion. The rotating electrical machine may be a generator. The rotating electrical machine may have multiple sound absorbing columns defining multiple air flow paths each extending along the axial length of the rotor. The MPP may comprise perforations of diameter in the range 0.5 mm to 1.2 mm. The MPP may comprise a plate of thickness 0.5 mm to 2.5 mm. The ratio of total area of perforations to total plate area may lie in the range 0.15% to 0.4%. The resonator cavity may have a depth in the range 150 mm to 400 mm, or 200 mm to 400 mm.

According to another aspect, the invention provides a method of controlling aerodynamic noise emissions from a ventilation path of a rotating electrical machine disposed within a generator housing, the method comprising:
 disposing a rotor within a rotor housing;
 providing an air flow path passing from the rotor housing to and through a silencer to an exhaust of the generator housing,
 providing the silencer with at least one air flow path disposed adjacent at least one sound absorbing column,
 passing cooling air along the at least one air flow path past a first portion of the sound absorbing column having a first sound absorbing material therein to act as a resistive acoustic absorber and
 passing cooling air along the at least one air flow path past a second portion of the sound absorbing column having a microperforated panel (MPP) and a resonator cavity to act as a reactive sound absorber.

BRIEF DESCRIPTION OF THE FIGURES

Embodiments of the present invention will now be described by way of example and with reference to the accompanying drawings in which.

DETAILED DESCRIPTION

Throughout the present specification, the descriptors relating to relative orientation and position, such as "top", "bottom", "horizontal", "vertical", "left", "right", "up", "down", "front", "back", as well as any adjective and adverb derivatives thereof, are used in the sense of the orientation of the apparatus as presented in the drawings in a conventional mode of use. However, such descriptors are not intended to be in any way limiting to an intended use of the described or claimed invention.

Figure 1A:
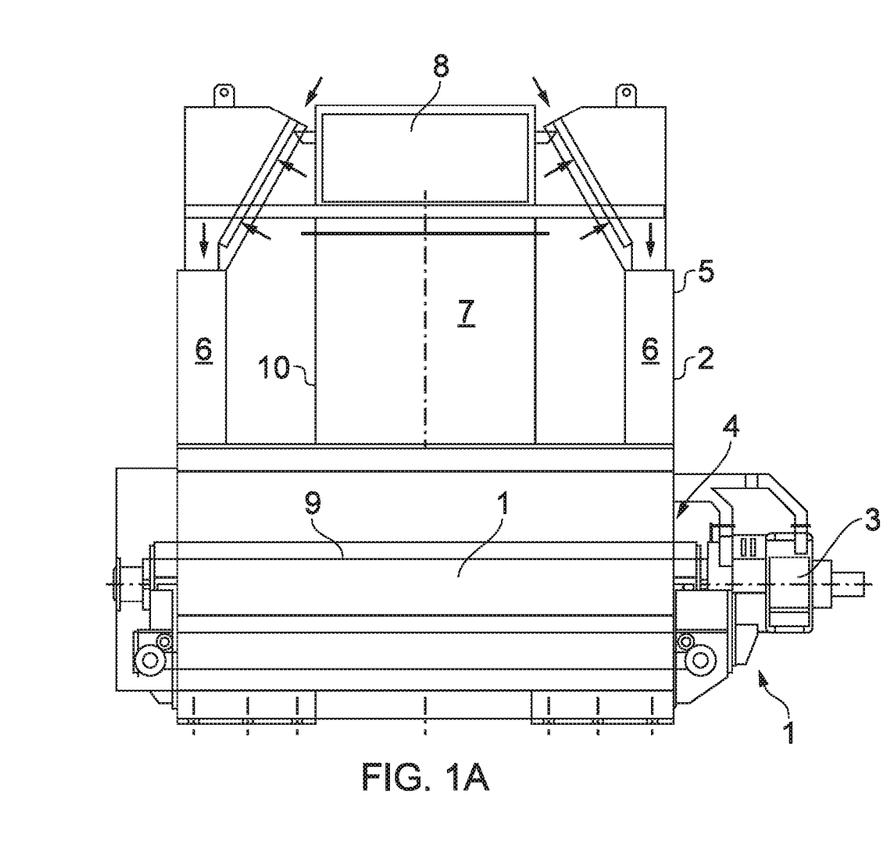
FIG. 1A shows a schematic cross-sectional side view of an electrical generator showing the positioning of a silencer unit within the generator housing.

FIG. 1A shows a schematic diagram of an electrical generator 1 within a generator housing 2. The generator 1 has a rotation axis 3 extending longitudinally through the housing 2 as seen in the side view of FIG. 1A. The lower part 4 of the housing 2 provides an enclosure for the generator 1 and associated equipment, which may be more generally referred to herein as a rotor housing. The upper part 5 of the housing 2 provides air inlet structures 6, an air outlet structure/silencer 7 which includes an air exhaust treatment module 10 (FIG. 1B), and air outlet louvres 8 for exhausting air from the housing 2. This is best seen in the axial cross-sectional view of FIG. 1B.

Figure 1B:
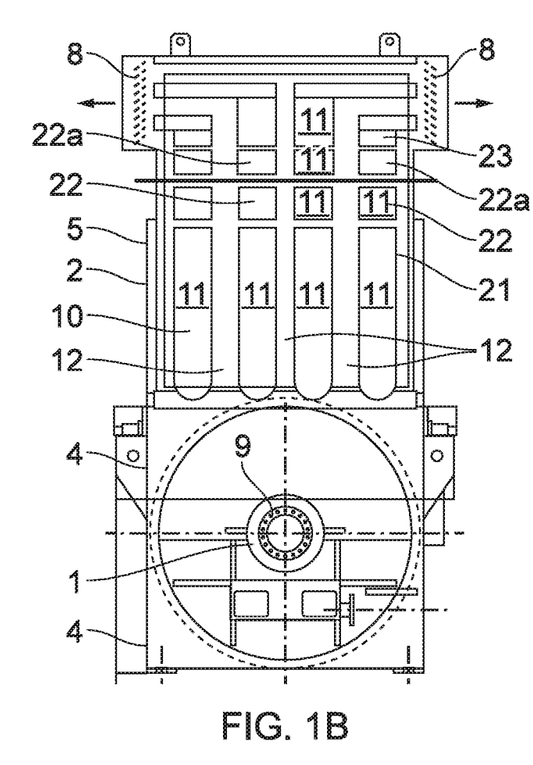
FIG. 1B shows a schematic cross-sectional end view of the electrical generator of FIG. 1A.

Ventilation/cooling air is provided to the axial ends of the generator 1 from the air inlet structures 6 and is conveyed axially along ventilation slots in the rotor 9 of the generator 1. From the ventilation slots of the rotor the air is ejected under rotational motion of the rotor, and passes through the silencer 7/exhaust treatment module 10 and through the outlet louvres 8.

In a rotating electrical machine such as the electrical generator 1, aero-acoustic noise is generated at least in part due to the high velocity air jets exiting the rotor ventilation slots. The aero-acoustic noise may have a strong low frequency component, and can be particularly severe at twice the operating frequency of the generator. There may also be higher order harmonics related to the number and spacing of the rotor ventilation slots. In the air exhaust treatment module 10, this noise is attenuated by dissipative silencers, comprising acoustic splitters 11. As seen in FIG. 1B, a number of acoustic splitters 11 extend upwardly from the lower part 4 of the generator housing 2 towards the top of the exhaust air treatment module 10 where the outlet louvres 8 are situated. The acoustic splitters 11 define exhaust air flow pathways 12 in the spaces between them, which direct the exhaust air to the louvres 8. The acoustic splitters 11 comprise multiple portions in each column, the characteristics of which are described below.

Figure 2:
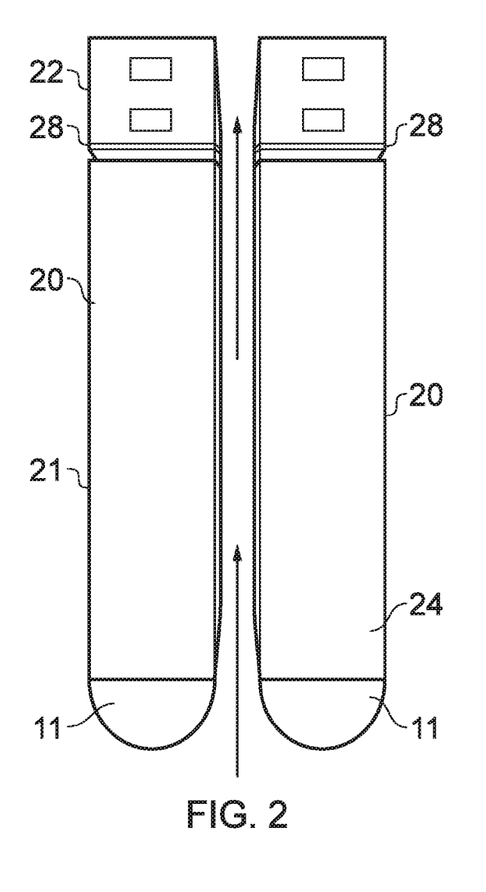
FIG. 2 is an end view of two sound absorbing columns used in the generator housing of FIGS. 1A and 1B.

The acoustic splitters 11 are shown in more detail in FIG. 2. Each acoustic splitter comprises a sound absorbing column 20 having a first portion 21 closest to the rotor/generator 1 and a second portion 22 further away from the rotor/generator 1. For convenience, the first portion 21 may be considered as being in an "upstream" position, i.e. closer to the noise source/air source/rotor, and the second portion 22 may be considered as being in a "downstream" position, i.e. away from the noise source/air source/rotor.

The first portion 21 contains a first sound absorbing material, which is preferably a porous absorber such as foam or Rockwool. The first portion 21 of the sound absorbing column 20 may comprise a frame having rigid sides 24, structural supports 26 such as cross-members, and a face 27 adjacent to the air flow path 12 which exposes the sound absorbing material to the air flow path 12. The face 27 may comprise an open mesh barrier or perforated panel to retain the porous absorber in place within the frame of the first portion 21 of the sound absorbing column and to allow air movement into and out of the structure. The mesh may comprise a metal lattice structure for example. Alternatively, the face 27 could comprise a solid material allowing sound energy to pass therethrough to the porous absorber. In a general aspect, the first portion 21 comprises a resistive acoustic absorber or resistive sound absorbing unit.

The second portion 22 comprises a microperforated panel (MPP) 28 adjacent to the top (i.e. the downstream end) of the first portion 21, and a resonator cavity 29 downstream of the MPP 28. The second portion 22 effectively provides a reactive acoustic absorber or reactive sound absorbing unit. As such, the second portion 22 need not contain a porous sound absorber material, such as foam or Rockwool.

Figure 4:
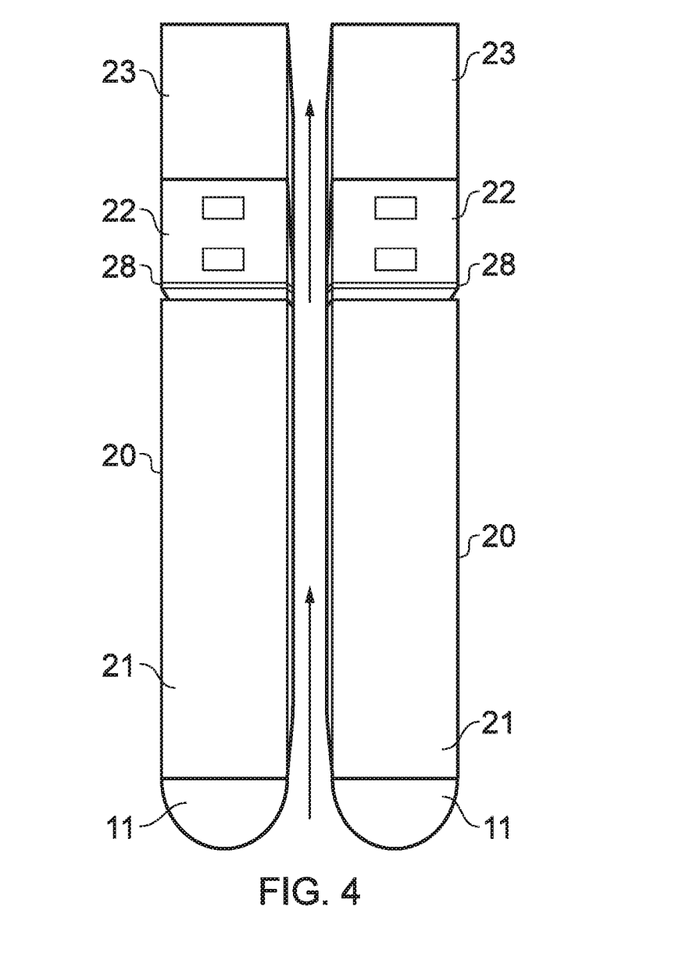
FIG. 4 is an end view of two alternative sound absorbing columns used in the generator housing of FIGS. 1A and 1B.
Figure 5:
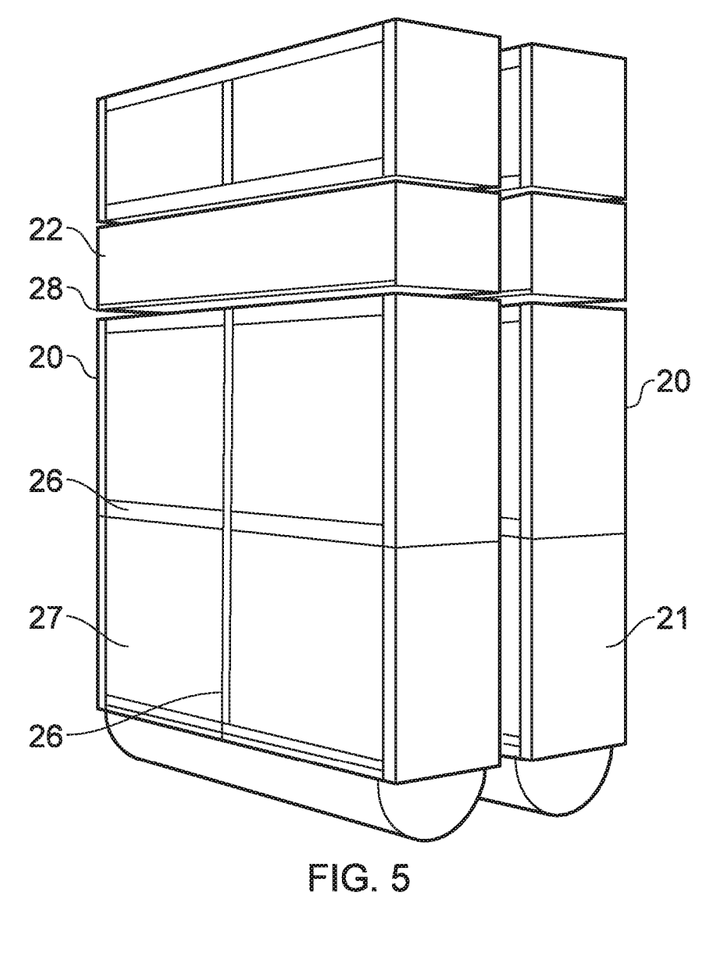
FIG. 5 is a perspective view of the two sound absorbing columns of FIG. 4.

Referring also to FIGS. 4 and 5, the sound absorbing columns 20 may include a third portion 23 above, i.e. downstream of, the second portion 22. The third portion 23 may comprise a further resistive acoustic absorber structure similar to the first portion 21.

Two or more sound absorbing columns 20 may define multiple air flow paths 12 each extending along the axial length of the rotor/generator. The example of FIG. 1B and FIG. 7 comprises four sound absorbing columns 20 which split the airflow into five air flow paths 12.

Figure 6:
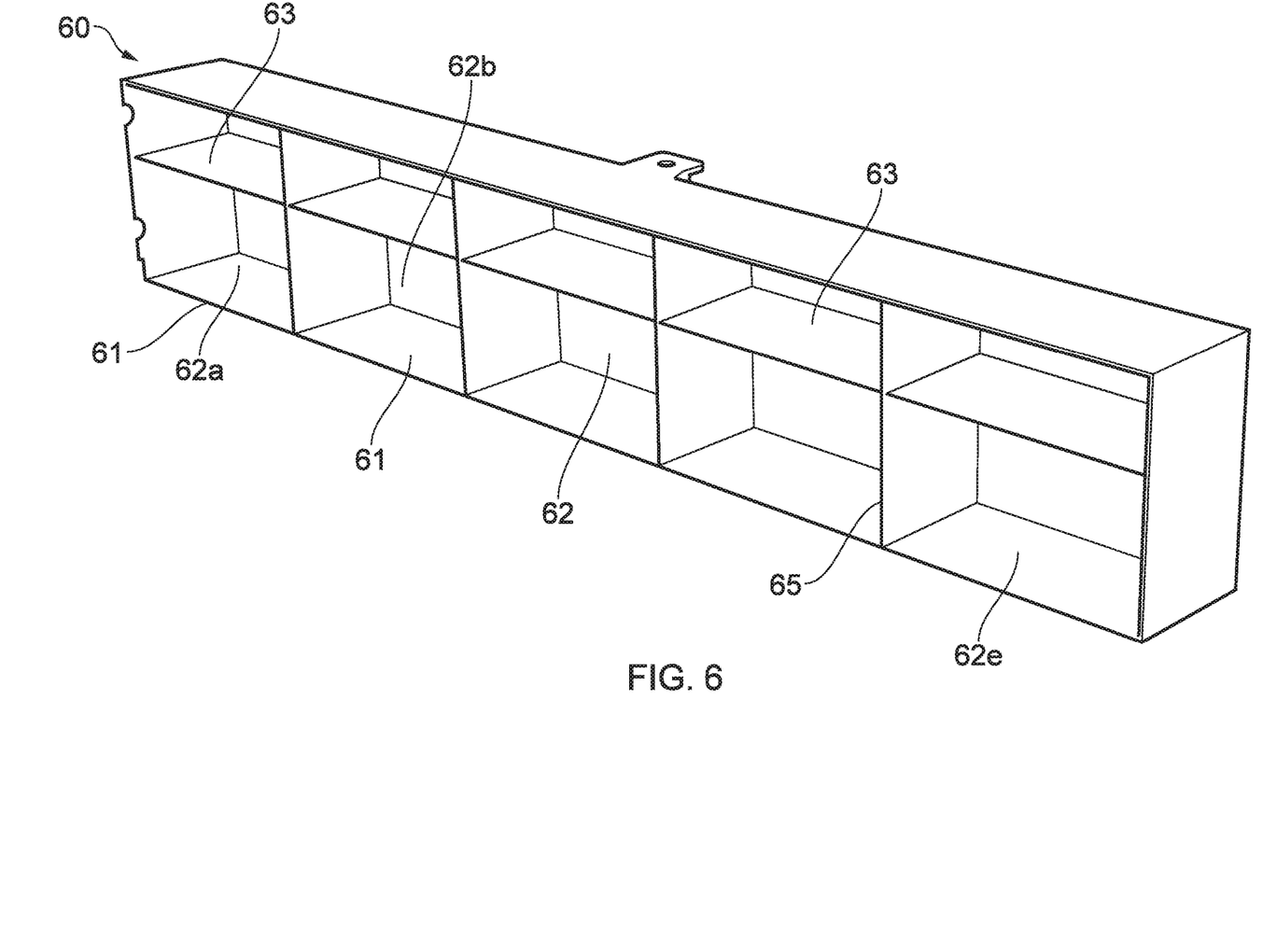
FIG. 6 is a perspective view of a reactive sound absorbing unit usable in the columns of FIGS. 2 to 5.

With reference to FIG. 6, the second portion 22 may comprise more than one MPP 28. In the example shown in FIG. 6, the second portion 60 comprises a first MPP 61 adjacent to the downstream end of the first portion 21, a resonator cavity 62 downstream of the first MPP 61, and a second MPP 63 downstream of the first MPP 61 dividing the resonator cavity 62 into two parts. This arrangement will be discussed in more detail later.

In a general aspect, the first portion 21 (resistive sound absorbing unit) of the sound absorbing column 20 may therefore lie between the rotor/generator 1 and the second portion 22 (reactive sound absorbing unit) of the sound absorbing column 20. The second portion 22 of the sound absorbing column 20 may lie between the first portion 21 and the third portion 23.

The microperforated panel or panels 28, 61, 63 are preferably configured to optimise the acoustic performance of the silencer/air outlet structure 7 for the particular application, e.g. the particular rotating electrical machine in use. The silencer structure is preferably tuned for a broad peak absorption between 80 and 180 Hz, or more particularly may be tuned for a peak absorption between 100 and 120 Hz, or at one of those frequencies. Using dual microperforated panels 61, 63 as in FIG. 6 may provide a broader peak absorption between 60 and 300 Hz or more particularly may be tuned for a peak absorption between 100 and 120 Hz.

The integration of the second portion 22 into a sound absorbing column 20, thereby defining a resonator cavity 62 and the MPP 28, 61, 63 has been found to substantially improve the acoustic performance of the exhaust air treatment assembly 10 to absorb the aero-acoustic noise caused by the high velocity air jets exiting the rotor ventilation slots which have a strong low frequency component, particularly severe at twice the operating frequency of the generator. The higher order harmonics related to the number and spacing of the ventilation slots on the rotor are more effectively attenuated by the dissipative resistive silencers of the first and (optional) third portions 21, 23.

Tests have shown that the first and third portions 21, 23 incorporating the porous materials are effective at absorbing frequencies above 200 Hz with good broadband performance, but can be rather less optimal for suppressing noise at the 50 Hz and 60 Hz operating frequencies of typical generators, and particularly at the first harmonics thereof at 100 Hz and 120 Hz, particularly as measured at the outlet louvres 8.

Figure 7:
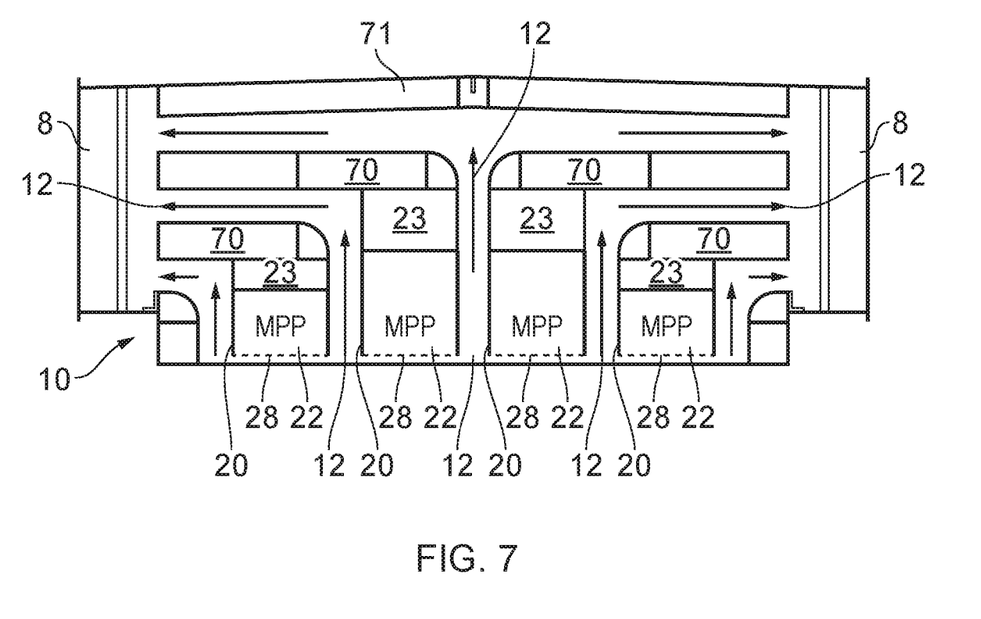
FIG. 7 is a schematic cross-sectional end view of a top portion of the silencer unit of FIG. 1B.

FIG. 7 shows a possible arrangement for the upper part of the air exhaust treatment module 10. In this arrangement, some or each of the sound absorbing columns 20 with the first portion 21 (not visible), the second portion 22 comprising the MPP 28 (or MPP 61, 63) and the resonator cavity 62, and the third portion 23, may further include a transverse fourth portion 70 to direct the air flows in air flow paths 12 laterally outward to the louvres 8. The transverse fourth portions 70 may incorporate more of the first sound absorbing material, preferably a porous absorber such as foam or Rockwool. Further resistive absorbing material 71 may be provided on the roof of the upper part 5 of the housing 2.

Figure 8:
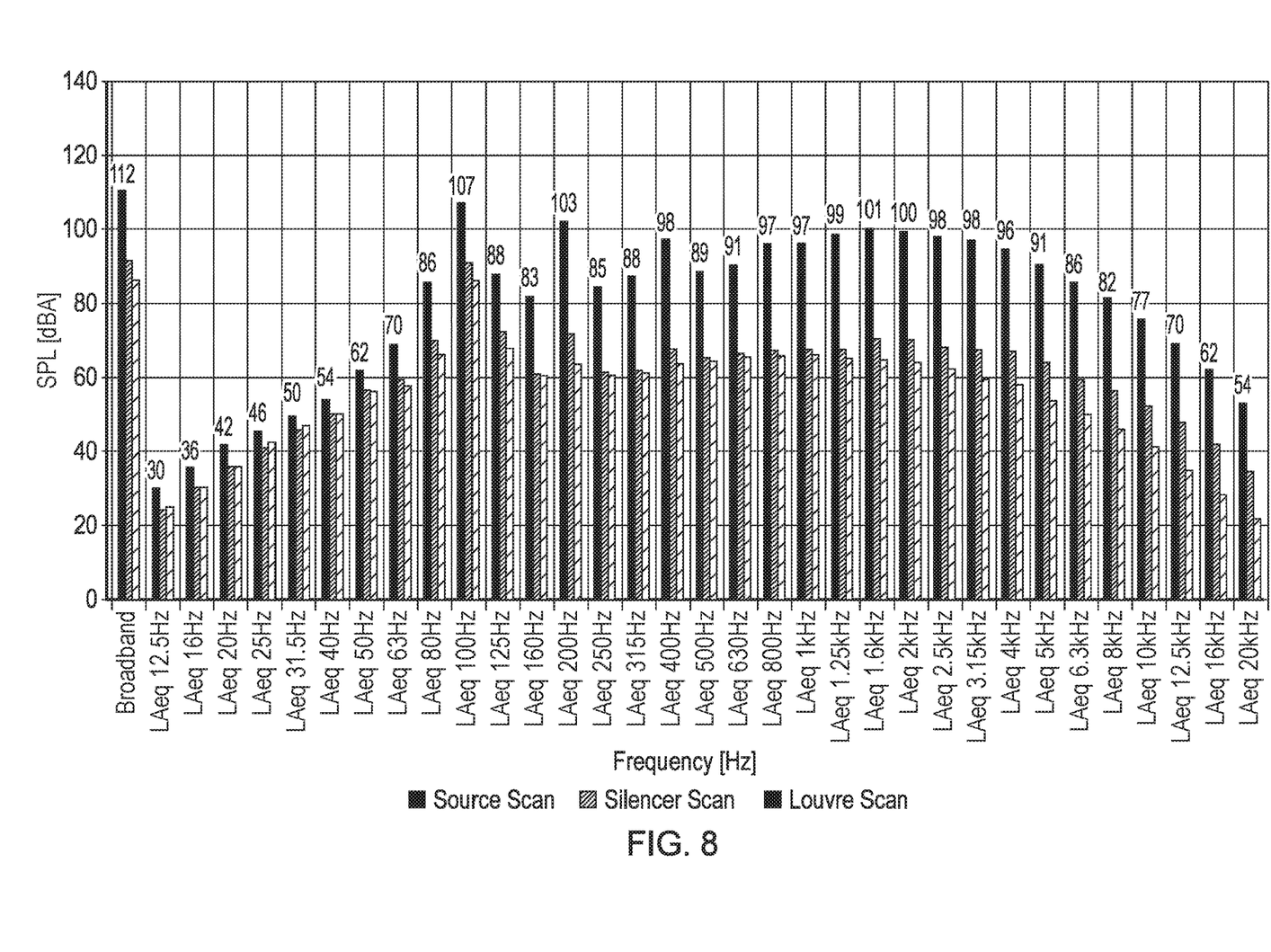
FIG. 8 is a graph showing a noise reduction spectrum of a silencer unit for use with the generator of FIGS. 1A and 1B, using only resistive sound absorbing structures.

FIG. 8 provides an illustration of the noise reduction properties of an air exhaust treatment module assembly 10 similar to the arrangements described above but without using the reactive acoustic absorption structures of the second portions 22, containing the MPPs 28, 61, 63 and resonator cavities 29, 62. This clearly shows that the basic structure using only resistive absorber material is effective at higher frequencies but has relatively poor performance at lower frequencies where the aero-acoustic noise from the rotor ventilation slots dominates. This has caused the noise levels at twice the operating frequency of the generator to appear dominant. In the graph, showing measured sound pressure levels, the higher of the three columns for each noise spectrum band represents noise levels at the rotor/generator source (i.e. upstream of the silencer); the next lower column for each noise spectrum band represents noise levels at the downstream end of the silencer/air exhaust treatment module. The lowest column for each noise spectrum band represents noise levels at the louvres.

The reactive acoustic absorbers, i.e. the second portions 22 of the sound absorbing columns 20 comprising the MPPs 28, 61, 63 and the resonator cavities 29, 62 can be optimally designed to attenuate the 100 Hz and 125 Hz centre band frequencies (or other target bands according to generator/rotor design and frequency of rotation), and the overall acoustic performance of the silencer assembly is thereby substantially improved without substantially affecting air flow.

The microperforated panels 28, 61, 63 each comprise a thin plate, shell, or membrane with many holes therein. No resistive porous material is required in the resonator cavity 29, 62. The principal absorption mechanism may be provided by the resistance offered by the viscous losses in the holes of the panels 28, 61, 63 as the air molecules move back and forth under the influence of the sound pressure. The air co-vibrates as a mass in the numerous adjacent holes, with the air in the intermediate space between the absorber and a usually rigid rear wall acting as a spring similar to a Helmholtz resonator. By forming a closed space behind the MPP 28, 61, 63, multi-modal acoustic resonances can be created. Cavity modes which couple to the air motion inside the micro-perforations contribute toward the sound absorption. The MPP and the material defining the cavity can be formed from any suitable material having the requisite stiffness to impart the required acoustic chamber properties.

In one example, the walls of the resonator cavity 29, 62 are formed of stainless steel of thickness between 1.2 and 3 mm thick providing the required stiffness.

The perforated panels 28, 61, 63 can be designed to optimise the acoustic absorption of the exhaust air treatment module 10. Pore diameters may be provided of the order of millimetres or even centimetres with little acoustic resistance and high reactance, or may be sub-millimetre in size providing high acoustic resistance. Preferably, hole diameters are selected such that they are in the same order of magnitude as the acoustic boundary layer of a steady flow in the holes which allows for optimum damping of the resonance-amplified vibrations in the holes.

The geometric parameter that is most instrumental in tuning the performance of the MPP is the resonator cavity depth which controls the air molecule velocity in the holes. The MPP absorbers are most effective when the particle velocity is high because this maximises the viscous friction in the holes. As the sound absorption of the MPP absorber is dominated by the resonance of the air mass vibration, in both the perforated holes and the backing cavity, it is limited to the resonance frequency region; therefore its bandwidth can be relatively narrow.

Figure 9:
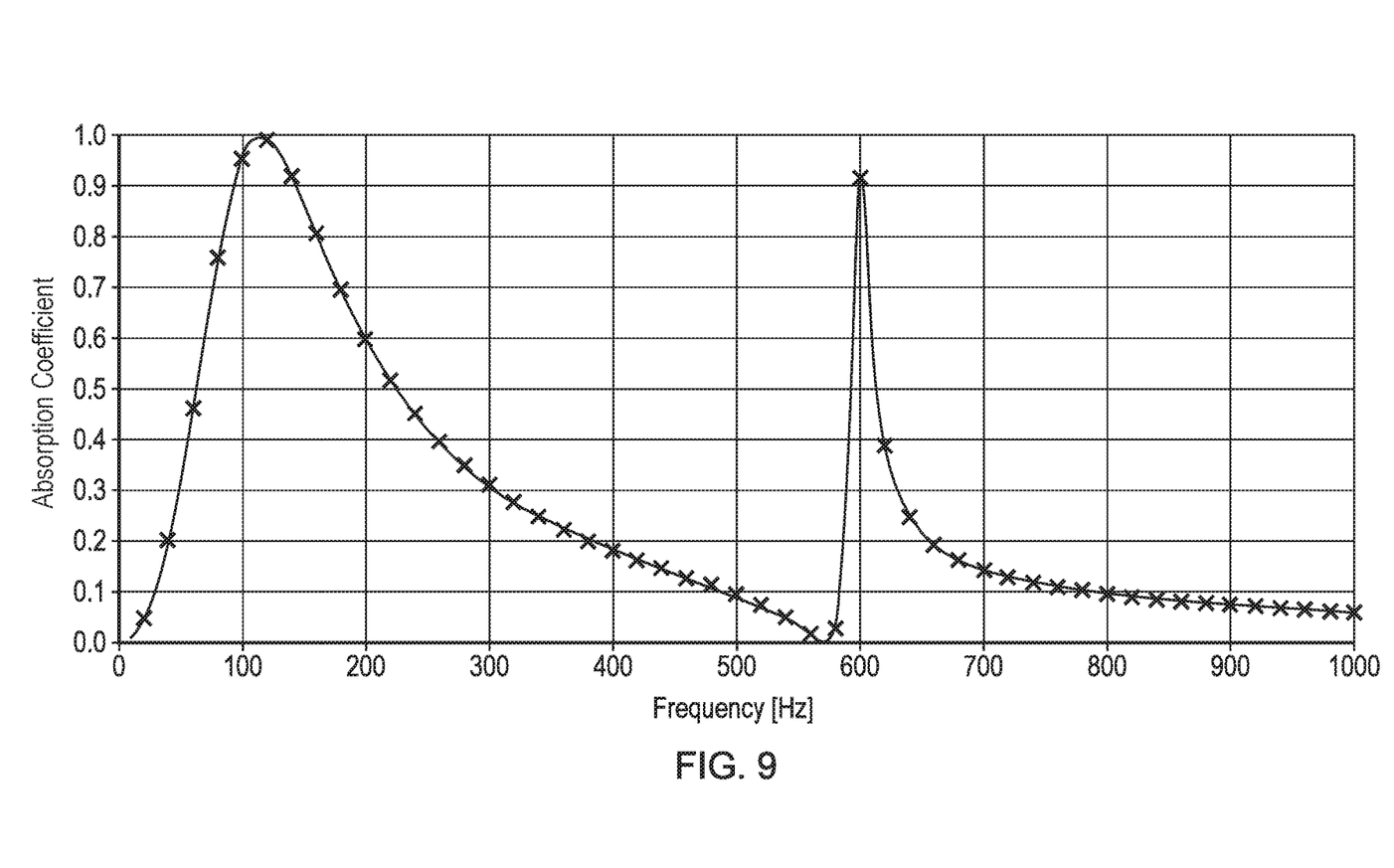
FIG. 9 is a graph showing a calculated normal incidence sound absorption coefficient spectrum for a plane wave striking a reactive sound absorbing unit for use in the sound absorbing columns of FIGS. 3 to 5.

A typical harmonic analysis of a normal incidence sound absorption coefficient for a MPP absorber is shown in FIG. 9. For this absorber, the MPP 28 has perforation holes of diameter 0.8 mm, MPP panel thickness of 1.5 mm, perforation ratio (ratio of total area of holes to total plate area of 0.4%, and resonator cavity depth of 300 mm. A peak absorption can be engineered at approximately 100 Hz or 120 Hz, thereby being optimised for international operational requirements for generators that deliver AC power at 50 Hz or 60 Hz. A peak absorption could also be engineered at any suitable frequency of the rotating electrical machine, e.g. peak absorption at the electrical supply frequency of the rotor or harmonic thereof.

Two further potential MPP absorbers were designed, predicted to have high normal incident sound absorption coefficients at 100 Hz and 120 Hz. The dimensions of the two MPPs are given below.

| Type | Hole diameter (mm) | Panel thickness (mm) | Perforation ratio (%) |
|---|---|---|---|
| 1 | 0.9 | 0.8 | 0.25 |
| 2 | 1.0 | 1.0 | 0.21 |

Figure 10:
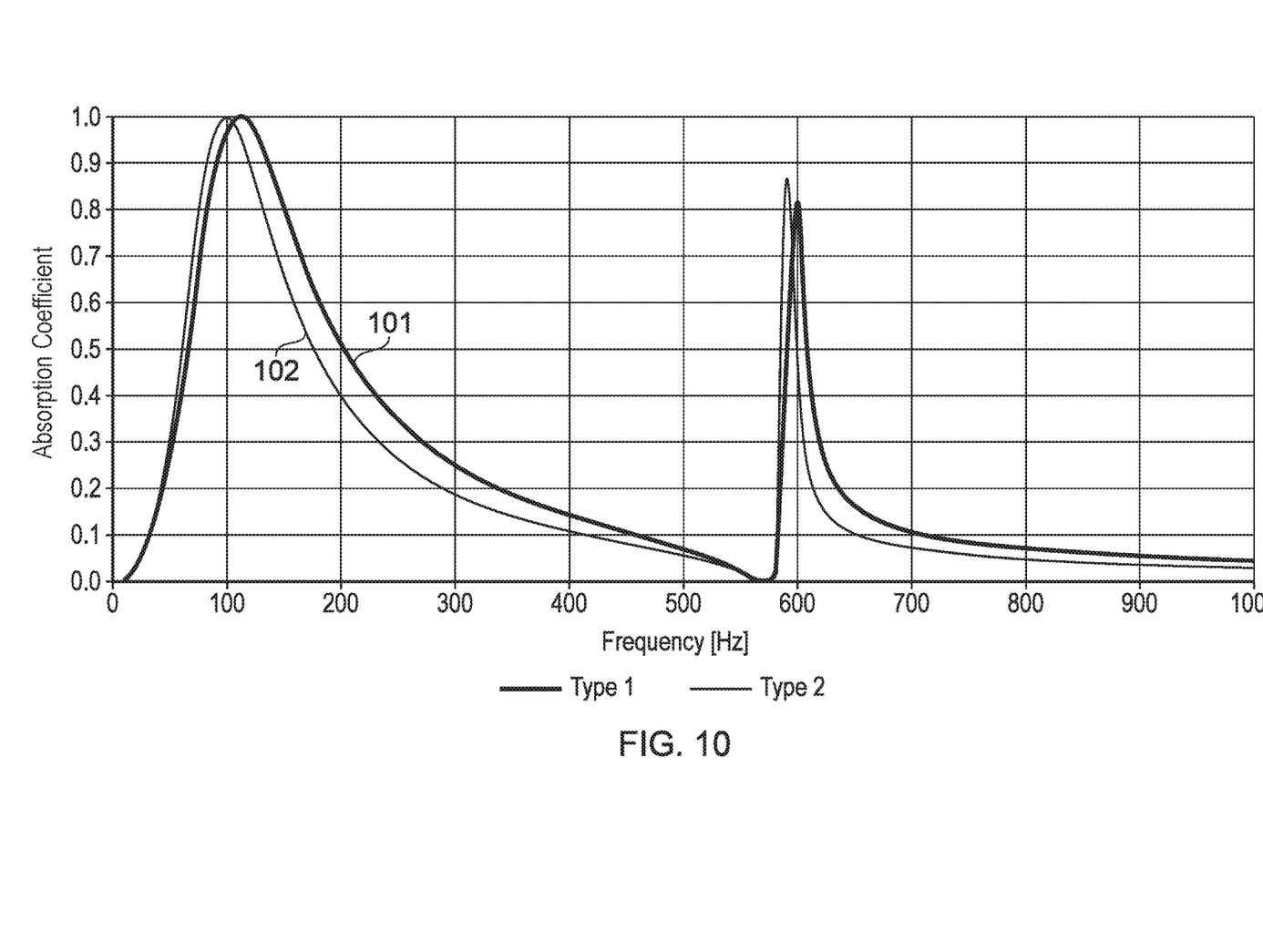
FIG. 10 is a graph showing a predicted normal incidence sound absorption coefficient spectra for plane waves striking two different reactive sound absorbing units for use in the sound absorbing columns of FIGS. 3 to 5.

The predicted normal incidence sound absorption coefficients for the two types of MPP absorbers, both with a cavity depth of 300 mm, are shown in FIG. 10, with type 1 providing trace 101 and type 2 providing trace 102.

With further reference to FIG. 6, the resonator cavity 29, 62 may be divided into plural compartments transverse to the silencer air flow direction, with partitions 65 spaced along the width of the cavity (e.g. partitions that are orthogonal to the plane of the MPP 28, 61). Sound absorption of grazing waves (waves propagating parallel to the MPP 28, 61) may be less effective if the resonator cavity 29, 62 is not partitioned. However, waves that propagate normal to the MPP are attenuated equally without a partitioned cavity. Studies indicate that partitioning the cavity disrupts wave propagation behind the MPP 28, 61 and forces the MPP to behave like a traditional locally reacting absorber. Preferably, the spacing between adjacent partitions 65 should minimally be less than a half acoustic wavelength. An example design has partitions of width 300 mm.

In the illustrated arrangements, the acoustic pressure wave should propagate normal to the MPP and hence partitioning may not be required. However, to remove any potential risk of performance deterioration due to random/grazing incident acoustic waves, the backing cavity was partitioned into five separate cavities 62a, 62b . . . 62e as shown in FIG. 6. This has an added benefit of stiffening the structure, particularly where the width of the structure extends along a substantial part of the axial length of the generator as depicted in FIG. 1. In an alternative configuration, separate reduced-width acoustic splitters 11 could be deployed side-by-side along the axial length of the generator.

Figure 3:
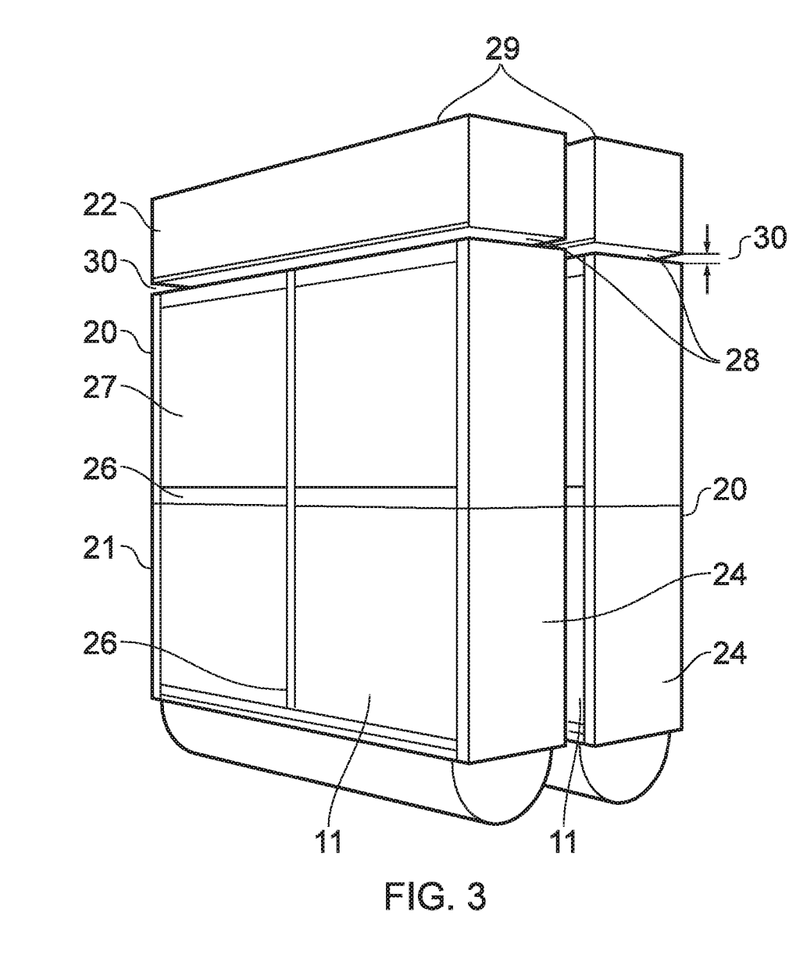
FIG. 3 is a perspective view of the two sound absorbing columns of FIG. 2.

Referring again to FIG. 3, further improvement in noise reduction may be achieved by adjusting the spacing 30 between the first portion 21 and the second portion 22 of the sound absorbing columns 20. In a preferred arrangement, the highest noise reduction was found to be achieved with a 25 mm spacing between the first portion 21 and the second portion 22. The spacing between the first portion 21 and second portion 22 (and between the second portion 22 and the third portion 23 where applicable) may be maintained by the first, second and third portions being bolted to a support frame, not shown.

In general, two or even more reactive absorbers may be provided by the second portion 22 of the sound absorbing columns 20, the reactive absorbers being arranged in series in the air flow direction. For example, with reference to FIG. 2, lower second portion 22 may be configured as an MPP absorber tuned for attenuation at a first frequency, e.g. 50 Hz or 100 Hz, and an upper second portion 22a may be configured as an MPP absorber tuned for attenuation at a second frequency, e.g. 60 Hz or 120 Hz. It has been found, however, that for frequencies of interest including 100 Hz and 120 Hz, and with cavity depths in the range 260-300 mm, most of the acoustic energy is absorbed by the first two MPP absorbers and the addition of further reactive absorbers after the second may not contribute significantly to additional noise reduction. Omitting further reactive absorbers may however, contribute to reduced air flow resistance and therefore reduce an expected pressure-drop across the exhaust treatment module. Thus, two series-mounted reactive absorbers may be an optimal number in many circumstances.

In the examples shown, the depth dimension for the cavities that provide optimal noise reduction at 100 Hz and 120 Hz, for both types of MPP absorber, were found to be 260 mm for an upstream cavity and 300 mm for a downstream cavity.

Further refinements may be made to the silencer by taking into account the structural compliance of the walls of the MPP absorber cavity. The MPP absorber boxes 22 should preferably be of stiff enough mechanical construction to not bend or flex during operation, and should preferably be mechanically isolated from the outlet silencer housing to avoid picking up any vibrations from the housing itself.

As seen in FIG. 10, predicted normal incidence absorption coefficients of the two types of MPP (defined above as type 1 and type 2) may have a relatively narrow absorption bandwidth, and this may result in less optimal noise reduction at 200 Hz and 240 Hz, and potentially at higher frequencies. The absorption bandwidth of the MPP may be improved by using a dual MPP layer arrangement as illustrated in FIG. 6 and FIG. 11.

Figure 11:
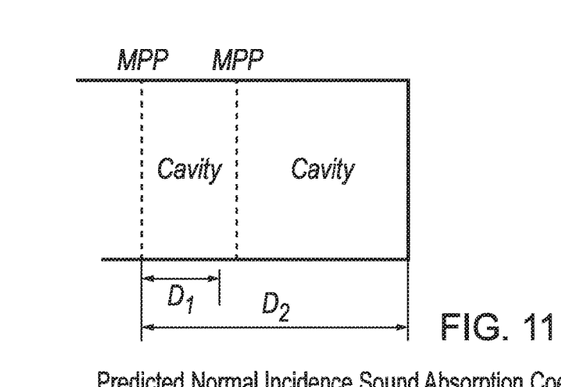
FIG. 11 is a schematic cross-sectional end view of an alternative, dual panel, reactive sound absorbing unit for use in the sound absorbing columns of FIGS. 3 to 5.
Figure 13:
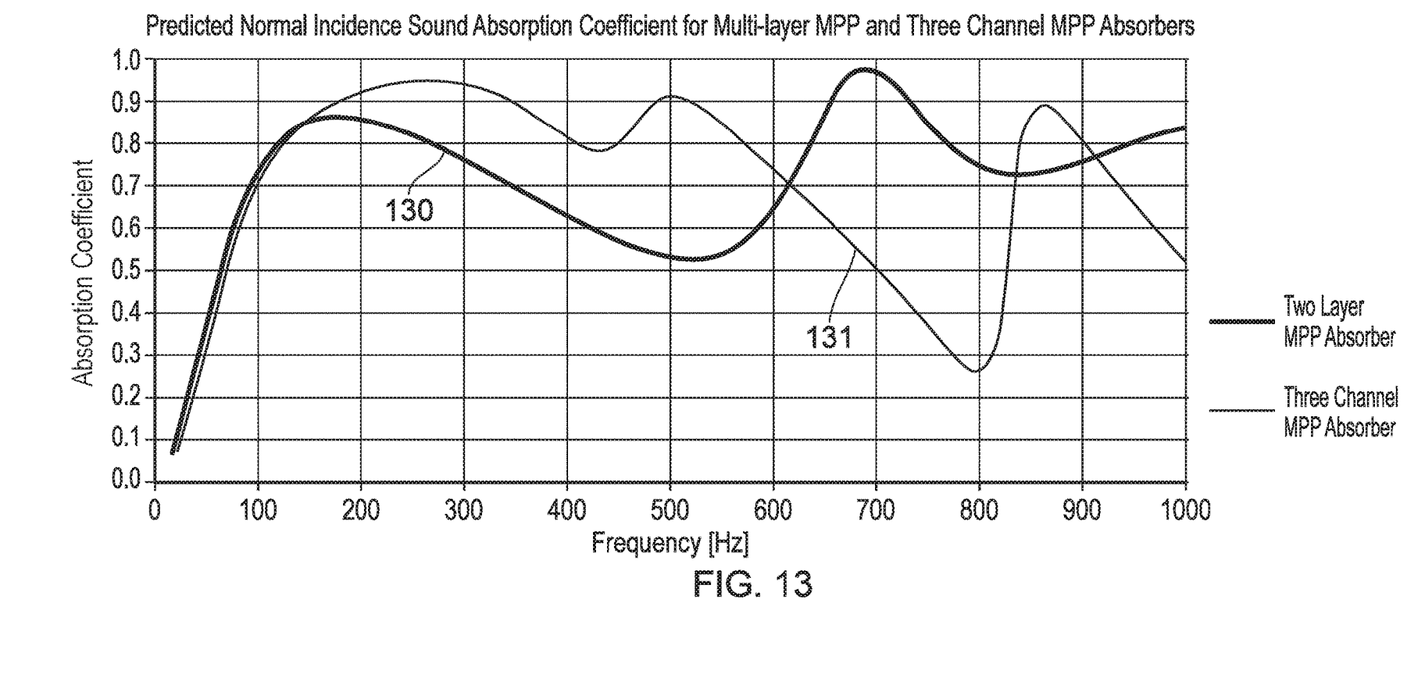
FIG. 13 is a graph showing predicted normal incidence sound absorption coefficient spectra for plane waves striking the reactive sound absorbing units of FIGS. 11 and 12.

With reference to FIGS. 11 and 13, predicted normal incidence sound absorption coefficients for a two-layer MPP absorber as seen in FIG. 11, having MPP hole diameters=0.3 mm, MPP thickness=1 mm, perforation ratio=1.5%, and with the two plates spaced 50 mm apart (D1) in a cavity of depth 300 mm (D2) provides an absorption coefficient spectrum 130 as shown in FIG. 13.

Figure 12:
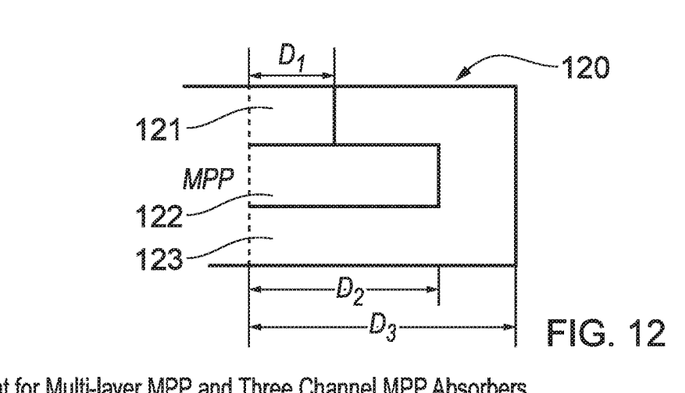
FIG. 12 is a schematic cross-sectional end view of an alternative, three-channel, reactive sound absorbing unit for use in the sound absorbing columns of FIGS. 3 to 5.

Another method for improving the bandwidth is the use of a cavity 120 with multiple channels or ducts 121, 122, 123 as shown in FIG. 12. The depths of the individual channels can be tuned to attenuate a particular frequency, with increased channel depth providing lower frequency absorption; hence more broadband frequency absorption is achieved. The normal incidence sound absorption coefficient for a MPP with hole diameters 0.3 mm, MPP thickness=1 mm, perforation ratio=1.5%, and with first cavity depth D1=150 mm; second cavity depth D2=225 mm and third cavity depth D3=300 mm provides an absorption coefficient spectrum 131 as shown in FIG. 13. Thus, in a general aspect, the resonator cavity may be divided into plural compartments 121, 122, 123 having different depths D1, D2, D3.

Although the described embodiments exemplify a silencer which is particularly tuned to absorb aero-acoustic noise from ventilation slots on a rotor of a generator, it will be understood that the silencer can be adapted to provide acoustic attenuation in respect of any feature of a rotating electrical machine which has a tendency to generate periodic air movements as a result of the rotation.

Other embodiments are intentionally within the scope of the accompanying claims.

The invention claimed is:

1. A rotating electrical machine comprising:
 a housing having a first part providing an enclosure for a rotor therein and a second part providing an enclosure for a silencer therein;
 an air flow path passing from the first part of the housing to and through the silencer to an exhaust,
 the silencer comprising at least one air flow path disposed adjacent at least one sound absorbing column, the at least one sound absorbing column comprising a first portion closest to the rotor having a first, porous, sound absorbing material therein and a second portion further from the rotor, the second portion having a microperforated panel (MPP) adjacent to a downstream end of the first portion and a resonator cavity downstream of the MPP, the air flow path having an elongate cross-sectional profile extending along the axial length of the rotor and a flow path direction passing along the first portion, the MPP and then the resonator cavity of the at least one sound absorbing column in a direction away from the rotor axis.

2. The rotating electrical machine of claim 1 in which the silencer comprises at least two of said sound absorbing columns and the at least one air flow path is defined between two of the sound absorbing columns.

3. The rotating electrical machine of claim 1 in which the sound absorbing column further includes a third portion having sound absorbing material therein.

4. The rotating electrical machine of claim 1 having a second MPP in the resonator cavity.

5. The rotating electrical machine of claim 1 in which the resonator cavity is divided into plural compartments transverse to the direction of the air flow path past the column.

6. The rotating electrical machine of claim 1 in which the resonator cavity is divided into plural compartments having different depths.

7. The rotating electrical machine of claim 1 in which the second portion of the column is tuned for a peak absorption between 80 and 180 Hz.

8. The rotating electrical machine of claim 4 in which the second portion of the column is tuned for a peak absorption between 60 and 300 Hz.

9. The rotating electrical machine of claim 1 in which the second portion of the column is tuned for a peak absorption at the electrical supply frequency of the rotor or harmonic thereof.

10. The rotating electrical machine of claim 1 in which the first sound absorbing material is a porous absorber or foam or a fibrous mineral wool.

11. The rotating electrical machine of claim 1 in which the rotating electrical machine is a generator.

12. The rotating electrical machine of claim 2 having multiple sound absorbing columns defining multiple air flow paths each having an elongate cross-sectional profile extending along the axial length of the rotor.

13. The rotating electrical machine of claim 1 in which the MPP comprises:
   perforations of diameter in the range 0.5 mm to 1.2 mm; or
   a plate of thickness 0.5 mm to 2.5 mm; or
   a plate in which the ratio of total area of perforations to total plate area lies in the range 0.15% to 0.4%.

14. The rotating electrical machine of claim 1 in which the resonator cavity has a depth in the range 150 mm to 400 mm.

15. The rotating electrical machine of claim 1 in which the second portion of the column is tuned for a peak absorption between 100 and 120 Hz.

16. The rotating electrical machine of claim 4 in which the second portion of the column is tuned for a peak absorption between 100 and 120 Hz.

17. The rotating electrical machine of claim 1 in which the resonator cavity has a depth in the range 200 mm to 400 mm.

18. The rotating electrical machine of claim 1 in which the at least one sound absorbing column extends from the first part of the housing.

19. The rotating electrical machine of claim 18 in which the at least one air flow path of the silencer is defined between at least two sound absorbing columns extending from the first part of the housing, wherein the air flow path has an elongate cross-sectional profile maintained between the at least two sound absorbing columns and a flow path direction passing along the first portion, the MPP and then the resonator cavity of each sound absorbing column in a direction away from the rotor axis.

20. A method of controlling aerodynamic noise emissions from a ventilation path of a rotating electrical machine disposed within a housing, the method comprising:
   disposing a rotor within a first part of the housing;
   disposing a silencer within a second part of the housing;
   providing an air flow path passing from the first part of the housing to and through the silencer to an exhaust of the generator housing,
   providing the silencer with at least one air flow path disposed adjacent at least one sound absorbing column, the at least one sound absorbing column comprising a first portion closest to the rotor having a first, porous, sound absorbing material therein and a second portion further from the rotor, the second portion having a microperforated panel (MPP) adjacent to a downstream end of the first portion and a resonator cavity downstream of the MPP, the air flow path having an elongate cross-sectional profile extending along the axial length of the rotor and a flow path direction passing along the first portion, the MPP and then the resonator cavity of the at least one sound absorbing column in a direction away from the rotor axis,
   passing cooling air along the at least one air flow path past the first portion of the sound absorbing column such that the first, porous sound absorbing material acts as a resistive acoustic absorber, and
   passing cooling air along the at least one air flow path past the second portion of the sound absorbing column such that the microperforated panel (MPP) and the resonator cavity act as a reactive sound absorber.

* * * * *